(12) United States Patent
Lovell

(10) Patent No.: US 8,689,832 B2
(45) Date of Patent: Apr. 8, 2014

(54) VOLUME BOOSTER WITH REDUCED NOISE TRIM

(75) Inventor: Michel K. Lovell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 494 days.

(21) Appl. No.: 12/901,018

(22) Filed: Oct. 8, 2010

(65) Prior Publication Data

US 2012/0060682 A1 Mar. 15, 2012

Related U.S. Application Data

(63) Continuation-in-part of application No. 12/882,549, filed on Sep. 15, 2010.

(51) Int. Cl.
*F15B 13/042* (2006.01)

(52) U.S. Cl.
USPC ............ 137/625.66; 137/596.14; 137/625.28; 91/463

(58) Field of Classification Search
USPC ............. 137/625.66, 596.14, 625.28, 625.37; 91/450, 463, 465; 251/50, 53, 55
See application file for complete search history.

(56) References Cited

U.S. PATENT DOCUMENTS

| | | | |
|---|---|---|---|
| 750,331 A | 1/1904 | Ackley | |
| 3,693,659 A | 9/1972 | Parola | |
| 4,505,865 A | 3/1985 | Wullenkord | |
| 4,617,963 A * | 10/1986 | Stares | 137/625.3 |
| 7,458,310 B2 * | 12/2008 | Junk | 91/463 |
| 7,845,268 B2 * | 12/2010 | Junk | 91/463 |
| 2004/0182074 A1 | 9/2004 | Steinke et al. | |
| 2005/0029416 A1 | 2/2005 | Buck et al. | |
| 2005/0211321 A1 * | 9/2005 | Bush et al. | 138/42 |
| 2005/0229775 A1 | 10/2005 | Junk | |
| 2007/0240774 A1 | 10/2007 | McCarty | |
| 2009/0272442 A1 | 11/2009 | Fishwick | |
| 2009/0283160 A1 | 11/2009 | Fishwick et al. | |
| 2010/0207045 A1 | 8/2010 | Koch et al. | |

FOREIGN PATENT DOCUMENTS

| | | |
|---|---|---|
| DE | 33 04 523 A1 | 8/1984 |
| DE | 202 11 249 U1 | 12/2003 |
| WO | WO-2004/072475 A2 | 8/2004 |
| WO | WO-2005/103542 A1 | 11/2005 |
| WO | WO-2005/106256 A1 | 11/2005 |

OTHER PUBLICATIONS

"Fairchild Model 4800A Pneumatic Volume Booster: Installation, Operation and Maintenance Instructions,", Mar. 2010.

(Continued)

*Primary Examiner* — Craig Schneider
(74) *Attorney, Agent, or Firm* — Marshall, Gerstein & Borun LLP; Michael P. Furmanek

(57) ABSTRACT

A fluid flow control device having a body having a inlet connection, an outlet connection, a discharge port and a booster module disposed within the body. The booster module including a control element and an actuator element having a noise-reducing trim element with a supply path extending between the inlet connection and the outlet connection and an exhaust path extending between the outlet connection and the discharge port. The noise-reducing trim element being coupled immediately adjacent to the discharge port such that the noise-reducing trim element distributes a fluid flow to the discharge port via the exhaust path into a plurality of fluid jets to substantially inhibit jet recombination at the discharge port.

20 Claims, 3 Drawing Sheets

(56) References Cited

OTHER PUBLICATIONS

"Valve Positioners and Volume Boosters, Series 61 Booster Relays, Introduction," understood to be publicly available at least as early as Sep. 14, 2010.
ControlAir Inc., Type 6000 Volume Booster: High Flow Capacity in a Rugged Casing, Retreived from the Internet on Jul. 20, 2010, Available at URL: http://www.controlair.com/boost_relay/6000boost.html, Feb. 9, 2010.
Fairchild Inductrial Products Company, Pneumatic Volume Booster, Model 200, Oct. 2000.
Fairchild Inductrial Products Company, Pneumatic Volume Booster, Model 4500A, Jan. 2001.
Fairchild Industrial Products Company, Pneumatic Volume Booster, Model 200XLR, Oct. 2000.
Young Tech c., Ltd., "Users Manual," Volume Booster Relays, Jun. 2007.
Partial International Search Report for Application No. PCT/US2011/051412, dated Dec. 28, 2011.
International Preliminary Report on Patentability for Application No. PCT/US2011/051406, dated Mar. 19, 2013.
International Preliminary Report on Patentability for Application No. PCT/US2011/051412, dated Mar. 19, 2013.
International Search Report and Written Opinion for Application No. PCT/US2011/051406, dated Dec. 28, 2011.
International Search Report for Application No. PCT/US2012/061285, dated Mar. 8, 2013.
International Search Report and Written Opinion for Application No. PCT/US2011/051412, dated Feb. 10, 2012.

* cited by examiner

VOLUME BOOSTER WITH REDUCED NOISE TRIM

RELATED APPLICATIONS

This is a continuation in part of U.S. patent application Ser. No. 12/882,549 filed Sep. 15, 2010 entitled "Volume Booster with Stabilized Trim" which is hereby incorporated by reference.

FIELD OF THE DISCLOSURE

The present disclosure relates to fluid flow control systems, and more particularly, to volume boosters for enhancing control valve performance in fluid flow control systems.

BACKGROUND

Systems for controlling the flow of fluids, such as compressed air, natural gas, oil, propane, or the like, are generally known in the art. These systems often include at least one control valve for controlling various flow parameters of the fluid. Typical control valves include a control element such as a valve plug, for example, movably disposed within the flow path for controlling the flow of the fluid. The position of such a control element can be controlled by a positioner via a pneumatic actuator such as a piston actuator or a diaphragm-based actuator, as is known in the art. Conventional positioners deliver pneumatic signals via supply fluid to the actuator to stroke the control element of the control valve between an open and closed position, for example. The speed at which a the control valve can stroke partly depends on the size of the actuator and the flow of supply fluid contained in the pneumatic signal. For example, larger actuators/control valves typically take longer to be stroked when a positioner of equal flow output is used.

Therefore, such systems additionally employ one or more volume boosters located between the positioner and the actuator. The volume boosters are used to amplify the volume of supply fluid in relation to the pneumatic signal sent from the positioner, thereby increasing the speed at which the actuator strokes the control element of the control valve. Specifically, it should be understood by one of ordinary skill in the art that the volume booster is connected between the fluid supply and the valve actuator. Employing a pneumatic restriction in the volume booster allows large input signal changes to register on the booster input diaphragm sooner than in the actuator. A large, sudden change in the input signal causes a pressure differential to exist between the input signal and the output of the booster. When this occurs, the booster diaphragm moves to open either a supply port or an exhaust port, whichever action is required to reduce the pressure differential. The port remains open until the difference between the booster input and output pressures returns to within predetermined limits of the booster. A booster adjustment device may be set to provide for stable operation; (i.e. signals having small magnitude and rate changes pass through the volume booster and into the actuator without initiating booster operation).

However, conventional booster designs are susceptible to flow induced noise. It is generally known that highly velocity fluid streams generate noise resulting from jet or other highly concentrated fluid stream interaction flowing through a conduit or exiting an orifice. Noise attenuators may be affixed to such devices to substantially reduce such generated noise. However, such noise attenuators are typically located adjacent to and immediately downstream of exit point for the fluid. Such a mounting configuration may be disadvantageous. For example, locating the noise attenuator downstream from the volume booster may induce a pressure reversal across a diaphragm assembly substantially limiting the lifespan of the diaphragm assembly. Additionally, downstream from the noise exit port where pressure differentials are greatest, and therefore fluid velocities are the highest, jet recombination may occur leading to greater sound pressure levels (i.e. more intense or louder noise).

SUMMARY

One embodiment of the present disclosure provides a fluid flow control device comprising a body having a inlet connection, an outlet connection, and a discharge port; and a booster module disposed within the body comprising a control element and an actuator element having a noise-reducing trim element, the booster module having a supply path extending between the inlet connection and the outlet connection and an exhaust path extending between the outlet connection and the discharge port, the noise-reducing trim element being operatively coupled immediately adjacent to the discharge port such that the noise-reducing trim element distributes a fluid flow to the discharge port via the exhaust path into a plurality of fluid jets to substantially inhibit jet recombination at the discharge port.

In one embodiment, the actuator element comprises a diaphragm assembly.

In one embodiment, the diaphragm assembly includes a manifold and a first and a second diaphragm.

In one embodiment, the manifold comprises a seating member having a plurality of passageways and an outer cylinder portion having a plurality of passageways.

In one embodiment, the noise reducing trim element includes a plurality of passageways arranged to distribute the fluid flow therethrough to substantially inhibit fluid flow jet interaction.

In one embodiment, the noise-reducing element comprises a hollow cylinder having an inner surface and an outer surface in fluid communication via a plurality of through-holes.

In one embodiment, the passageways of the seating member have a larger cross sectional area than the passageways of the outer cylinder portion and further comprising an upper sealing member.

In one embodiment, the upper sealing member is affixed to the seating member via a swaged connection.

In one embodiment, a fluid flow control device, comprising a body having an inlet connection, an outlet connection, and a discharge port; and a booster module disposed within the body comprising a control element and an actuator element, the booster module having a supply path extending between the inlet connection and the outlet connection and an exhaust path extending between the outlet connection and the discharge port such that the actuation element further comprises a diaphragm assembly including a fluid pressure reduction device operatively coupled to the control element and disposed within the exhaust path to substantially eliminate a pressure reversal across the diaphragm assembly.

In one embodiment, the diaphragm assembly further includes a manifold and a first and a second diaphragm.

In one embodiment, the fluid pressure reduction device comprises a seating member having a plurality of passageways and an outer cylinder portion having a plurality of passageways.

In one embodiment, the exhaust path terminates at the discharge port and the fluid pressure reduction device is disposed upstream of the discharge port.

In one embodiment, the fluid pressure reduction device comprises a hollow cylinder having an inner surface and an outer surface in fluid communication via a plurality of through-holes.

In one embodiment, the passageways of the seating member have a larger cross sectional area than the passageways of the outer cylinder portion and further comprising an upper sealing member.

In one embodiment, the upper sealing member is affixed to the seating member via a swaged connection.

In one embodiment, a fluid flow device, comprising a body having an inlet connection, an outlet connection, and a discharge port; and a booster module disposed within the body comprising a control element and an actuator element, the booster module having a supply path extending between the inlet connection and the outlet connection and an exhaust path extending between the outlet connection and the discharge port, wherein the actuation element comprises a diaphragm assembly operatively coupled to the control element, the diaphragm assembly including an upper diaphragm and a lower diaphragm, an upper support plate and a lower support plate and an outer cylinder portion affixed therebetween to provide a predetermined space between the upper and lower diaphragms plates and maintain a substantially parallel orientation between such plates.

In one embodiment, the outer cylinder portion has an upper surface and a lower surface in a substantially parallel orientation.

In one embodiment, the upper support plate and the lower support plate have corresponding annular recesses to operatively receive the upper surface and the lower surface of the outer cylinder portion.

DETAILED DESCRIPTION OF THE PREFERRED EMBODIMENTS

The examples, i.e., embodiments, described herein are not intended to be exhaustive or to limit the scope of the invention to the precise form or forms disclosed. Rather, the following description has been chosen to provide examples of the one or more preferred embodiments to those having ordinary skill in the art.

Figure 1:
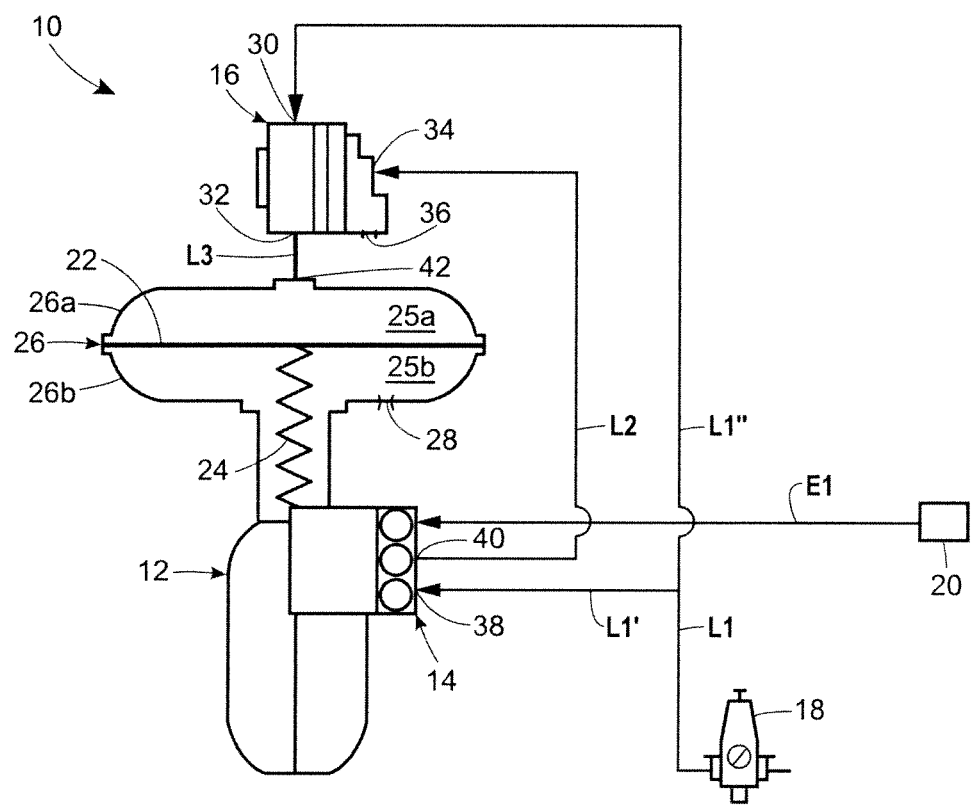
FIG. 1 is a schematic representation of a single-acting spring and diaphragm actuator assembly including a volume booster constructed in accordance with the principles of the present disclosure.

FIG. 1 provides a schematic representation of a single-acting spring and diaphragm actuator assembly 10 constructed in accordance with the principles of the present disclosure. Specifically, the actuator assembly 10 comprises an actuator 12, a positioner 14, and a volume booster 16. In the disclosed embodiment, the actuator assembly 10 is also illustrated as being fluidly coupled to a regulator 18. The actuator 12 is adapted to be operably connected to a control valve (not shown) equipped with a movable control element for controlling the flow of a fluid through a system such as a fluid distribution or other fluid management system, for example.

Still referring to FIG. 1, the volume booster 16 includes an inlet connection 30, a outlet connection 32, a control connection 34, and a discharge port 36. The positioner 14 includes an inlet 38 and an outlet 40. The actuator 12 includes a actuator supply port 42. The actuator 12, the positioner 14, the volume booster 16, and the regulator 18 communicate with each other via a plurality of fluid lines. Specifically, the regulator 18 is in fluid communication with the positioner 14 and the volume booster 16 via a supply line L1, which is split into a first supply line L1' and a second supply line L1". The outlet 40 of the positioner 14 is in fluid communication with the control connection 34 of the volume booster 16 via an output signal line L2. The outlet connection 32 of the volume booster 16 is in fluid communication with the actuator supply port 42 of the actuator 12 via a control line L3.

As will be described in more detail, the first supply line L1' is adapted to deliver a supply pressure to the inlet 38 of the positioner 14 and the second supply line L1" is adapted to deliver a supply pressure to the inlet connection 30 of the volume booster 16. The supply pressure can be provided to the supply line L1 via the regulator 18 from a pressure source such as a compressor, for example. Additionally, the positioner 14 is adapted to deliver a pneumatic control signal to the volume booster 16 via the output signal line L2 for controlling the operation of the actuator 12.

For example, based on an electrical signal received from a controller 20 via an electrical connection E1, the positioner 14 transmits a pneumatic signal to the control connection 34 of the volume booster 16 via the output signal line L2. The pneumatic signal passes through the volume booster 16 to drive the actuator 12 to actuate the control valve (not shown). Typically, the positioner 14 is adapted to generate a pneumatic signal of a relatively modest flow. Therefore, depending on the size of the actuator 12 and/or the desired speed at which the actuator 12 is to stroke the control valve, the volume booster 16 can operate to amplify the pneumatic signal with additional fluid flow sourced from the supply line L1, as will be described.

In the embodiment depicted in FIG. 1, the actuator 12 includes a fail-up actuator comprising a diaphragm 22 and a spring 24 contained within a diaphragm casing 26. The diaphragm casing 26 is formed from an upper casing 26a and a lower casing 26b creating an upper cavity 25a and a lower cavity 25b about diaphragm 22, respectively. The spring 24 is disposed in the lower cavity 25b of the casing 26 and biases the diaphragm 22 upward. Therefore, when the positioner 14 sends a pneumatic signal to the volume booster 16 via the output signal line L2, pneumatic flow is introduced into the upper cavity 25a of the actuator 12, thereby moving the diaphragm 22 downward. This downward movement is then transferred into a corresponding movement of the control element of the associated control valve (not shown), as is understood within the art.

Preferably, the casing 26 includes one or more vents 28 such that fluid contained within the lower cavity 25b vents out of the casing 26 when the diaphragm 22 moves downward. Such venting facilitates the movement of the diaphragm 22 in either the upward or downward direction. To stroke the actuator 12 upward, the positioner 14 vents the pneumatic signal to the volume booster 16 such that the spring 24 moves the diaphragm 22 upward. As the diaphragm 22 moves upward, the pressure built up in the upper cavity 25a of the casing 26 exhausts to the atmosphere via the control line L3, the discharge port 36 of the volume booster 16 and vent 28 draws in air to the lower casing 26b This exhausting to the atmosphere facilitates the movement of the diaphragm 22 in the upward direction.

Figure 2:
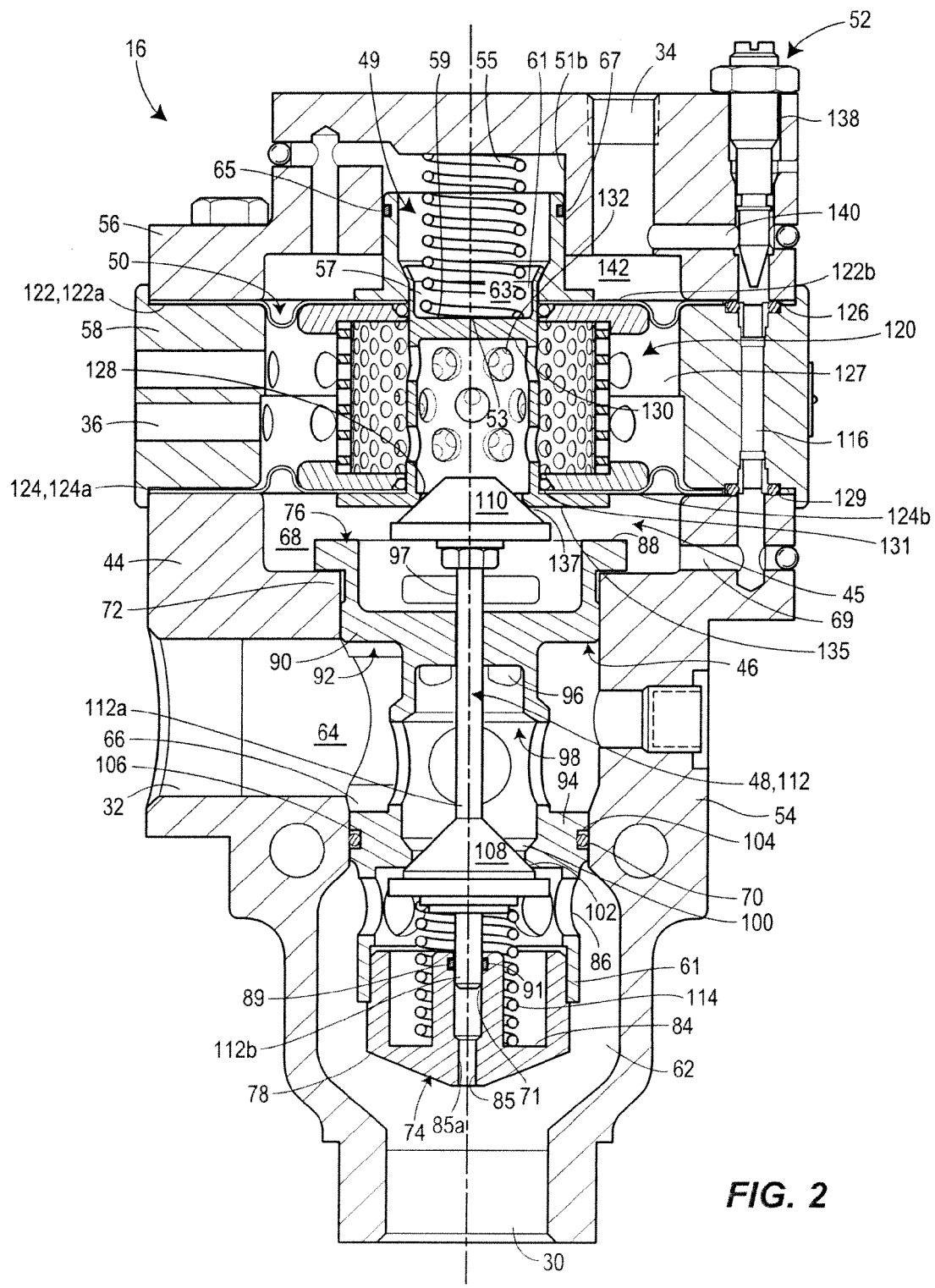
FIG. 2 is a side cross-sectional view of one embodiment of a volume booster constructed in accordance with the principles of the present disclosure.

With reference now to FIG. 2, one embodiment of the volume booster 16 depicted in FIG. 1 will be described. In general, the volume booster 16 includes a body 44, booster module 45 and a booster adjustment device 52. The body 44 generally includes a lower portion 54, a cap portion 56, and a spacer portion 58. The booster module generally includes a trim assembly 46, a control element 48, a diaphragm assembly 50, and a biasing assembly 49. The lower portion 54 of the body 44 defines the inlet connection 30 and the outlet connection 32. Additionally, the lower portion 54 defines a booster module trim opening 60, an inlet chamber 62, a outlet chamber 64, a intermediate region 66, an exhaust chamber 68, and a bypass passage 69. The intermediate region 66 is disposed between the inlet chamber 62 and the outlet chamber 64 and generally defines a cylindrical cavity including a lower web 70 and an upper web 72. The upper web 72 includes a threaded cylindrical opening receiving a corresponding portion of the trim assembly 46, as will be described. Similarly, the booster module trim opening 60 includes a cylindrical opening receiving a portion of the trim assembly 46. The cap portion 56 of the body 44 is disposed opposite the spacer portion 58 from the lower portion 54, thereby affixing the spacer portion 58 between the lower portion 54 and the cap portion 56, as illustrated. As shown in FIG. 2, the cap portion 56 defines, in part, a seating bore 51 slidably receiving at least a portion of the biasing assembly 49.

With continued reference to FIG. 2, the trim assembly 46 includes a unitary supply exhaust trim component 76. In the disclosed embodiment, the supply exhaust trim component 76 includes a cylindrical spring seat 74 removably threaded into the supply exhaust trim component 76. The supply trim component 74 also includes a spring seat 84. Additionally, as illustrated in FIG. 2, the supply trim component 74 includes a guide bore 85 having an first annular space 71. The guide bore 85 slidably receives a portion of the control element 48 within the first annular space 71 to guide the control element 48 and stabilize operation of the device. The supply trim component 74 further defines a circumferential groove 89 formed in an inner sidewall 85a of the guide bore 85. The groove 89 accommodates an elastomeric ring 91, which can include a lubricated rubber o-ring, for example. A skirt portion 61 includes a plurality of passages 86 extending radially therethrough. In the depicted embodiment, the passages 86 include cylindrical bores. Thus, the passages 86 extend along an axis that is generally perpendicular to an axis of the skirt portion 61. So configured, the skirt portion 61 of the supply trim component 74 restricts the flow of fluid through the body 44 from the supply chamber 62 to the outlet chamber 64 when the supply port is open (Not Shown). The exhaust trim component 76 includes a cylindrical bushing removably threaded into the cylindrical opening of the upper web 72 of an intermediate region 56 of the body 44. The exhaust trim component 76 also may include a flange portion 88, a restrictor portion 90, a skirt portion 92, and a seating portion 94.

The flange portion 88 of the exhaust trim component 76 is disposed within the exhaust chamber 68 of the body 44 and abutted against the upper web 72. The restrictor portion 90 includes a generally solid cylindrical member disposed within the cylindrical opening of the upper web 72 and defines a plurality of exhaust passages 96 and a control opening 97. In the depicted embodiment, the passages 96 in the restrictor portion 90 include cylindrical bores extending axially through the exhaust trim component 76. The skirt portion 92 extends from the restrictor portion 90 into the intermediate region 56 and defines a plurality of windows 98. So configured, the plurality of passages 96 in the restrictor portion 90 provides constant fluid communication between the outlet chamber 64 and the exhaust chamber 68, via the plurality of passages 96 in the restrictor portion 90.

The seating portion 94 of the exhaust trim component 76 includes a generally cylindrical member disposed within a cylindrical opening of the lower web 70 of the body 44. The seating portion 94 defines a central bore 100 and a valve seat 102. The central bore 100 is defined herein as a "supply port" of the volume booster 16. In the disclosed embodiment, the seating portion 94 also includes an external annular recess 104 receiving a seal 106 such as an o-ring. The seal 106 provides a fluid tight seal between the seating portion 94 of the exhaust trim component 76 and the lower web 70.

As illustrated in FIG. 2, the control element 48 of the disclosed embodiment of the volume booster 16 includes a control element 48 comprising a supply plug 108, an exhaust plug 110, and a stem 112. The stem 112 includes a central portion 112a and a guide portion 112b. The central portion 112a extends between and connects the supply plug 108 to the exhaust plug 110, and is slidably disposed in the control opening 97 of the restrictor portion 90 of the exhaust trim component 76. So configured, the exhaust plug 110 is disposed within the exhaust chamber 68 of the body 44, and the supply plug 108 is disposed within the supply chamber 62 of the body 44. More specifically, the supply plug 108 is disposed inside of the skirt portion 80 of the supply trim component 74 and is biased away from the supply trim component 74 by a spring 114. The spring 114 is seated against the spring seat 84 of the supply trim component 74. The spring 114 biases the supply plug 108 of the control element 48 into engagement with the valve seat 102 of the seating portion 94 of the exhaust trim component 76, thereby closing the "supply port" 100. In the disclosed embodiment, each of the supply and exhaust plugs 108, 110 includes a tapered cylindrical body defining a frustoconical seating surface. Other shapes of course could be implemented to satisfy the intended functions.

Additionally, the guide portion 112b of the stem 112 is slidably disposed in the guide bore 85 of the supply trim component 74 such that the elastomeric ring 91 is disposed between the guide portion 112b and the guide bore 85. So disposed, the elastomeric ring 91 creates friction between the guide portion 112b of the stem 112 and the guide bore 85 such as to eliminate the ability of small vibrations generated in the volume booster 16 to affect the axial position of the control element 48. Moreover, the elastomeric ring 91 can be radially compressed between the guide portion 112b of the stem 112 and the guide bore 85 such that the elastomeric ring 91 serves to center the guide portion 112b and eliminate vibrations generated in the volume booster 16, which can also affect the lateral position of the stem 112.

The spacer portion 58 of the body 44 of the volume booster 16 is positioned between the cap portion 56 and the lower portion 54. Generally, the spacer portion 58 includes an annular ring defining a radial through-bore, which comprises the discharge port 36 of the volume booster 16. Additionally, the spacer portion 58 defines an axial through-bore 116 in alignment with the bypass passage 69 of the lower portion 54 of the body 44. The discharge port 36 provides fluid communication between the exhaust chamber 68 of the lower portion 54 of the body 44 and the atmosphere, via the diaphragm assembly 50, as will be described.

Figure 3:
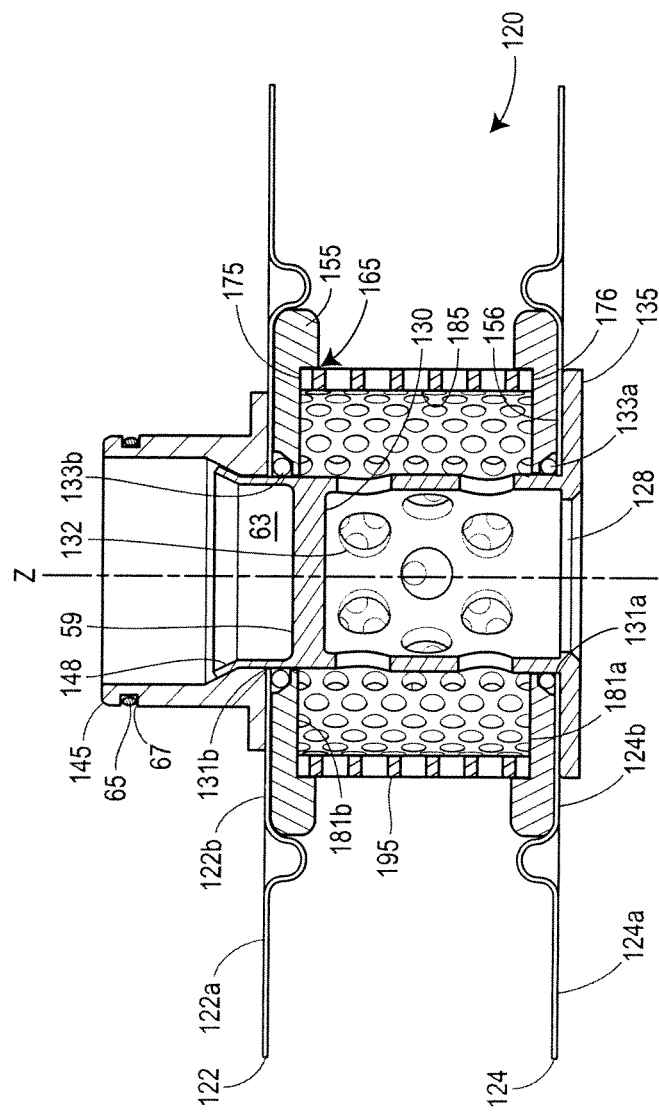
FIG. 3 is a side cross-sectional view of one embodiment of a diaphragm assembly constructed in accordance with the principles of the present disclosure.

Referring now to FIGS. 2 and 3, the diaphragm assembly 50 comprises a floating manifold 120 positioned between first and second diaphragms 122, 124. The first diaphragm 122 includes a flexible diaphragm made from a known diaphragm material and includes a peripheral portion 122a and a central portion 122b. The peripheral portion 122a is compressed between the cap portion 56 and the spacer portion 58 of the body 44 of the volume booster 16. The peripheral portion 122a additionally defines an opening 126 in alignment with the axial through-bore 116 of the spacer portion 58. The second diaphragm 124 similarly includes a flexible diaphragm made from a known diaphragm material and includes a peripheral portion 124a and a central portion 124b. The peripheral portion 124a of the second diaphragm 124 is compressed between the spacer portion 58 and the lower portion 54 of the body 44. The peripheral portion 124a additionally defines an opening 129 in alignment with the axial through-bore 116 of the spacer portion 58. The central portions 122b, 124b further define central openings 131a, 131b. The manifold 120 is disposed between the central portions 122b, 124b of the first and second diaphragms 122, 124 such that an annular passage 127 is defined between the manifold 120 and the spacer portion 58 of the body 44, as will be further described below.

The manifold 120 comprises a disc-shaped member movably disposed inside of the spacer portion 58 of body 44. The manifold 120 includes a seating member 135, and upper sealing member 145, an upper and lower support plate 155, 156 and an outer cylinder portion 165. The seating member 135 defines an axial opening 128, an internal cavity 130, and a plurality of internal radial passages 132 (i.e. through-holes in the seating member). The axial opening 128 is aligned with the central openings 131a, 131b in the diaphragms 122, 124 and is defined herein as an "exhaust port" of the volume booster 16. The seating member 135 defines a valve seat 137. The axial opening 128 provides for fluid communication between the exhaust chamber 68 of the lower portion 54 of the body 44 and the internal cavity 130 of the manifold 120. The internal radial passages 132 provide for fluid communication between the internal cavity 130 of the manifold 120 and the annular passage 127 disposed between the manifold 120 and the spacer portion 58 of the body 44. Additionally, upper and lower supports plates 155,156 include annular recesses 175, 176 to couple the outer cylinder portion 165 to each of the supports plate 155, 156 and may be affixed to the seating member 135 and the upper sealing member 145 by swaging, as depicted by tapered region 148, or any other known and suitable attachment method.

Still referring to FIG. 3, the manifold 120 provides a coupling mechanism to the upper and lower diaphragms 122,124. That is, as previously mentioned, the manifold 120 and the diaphragms 122,124 form the diaphragm assembly 50 by affixing the central portion of the diaphragms 131a, 131b between the upper sealing member 145 and the seating member 135 via the upper and lower plates 155,156 and the outer cylinder portion 165. The diaphragms 122, 124 are further sealed via elastomeric ring seals 133a, 133b disposed immediately adjacent to the upper and lower support plates 175, 176, respectively. Namely, the upper and lower surfaces 181a, 181b of the outer cylinder portion 165 are substantially parallel and engage corresponding parallel surfaces of the annular recesses 175, 176. The height of the outer cylinder portion 165 is a predetermined height to maintain separation between the upper and lower diaphragms 122, 124 during operation. The outer cylinder portion 165 may also substantially reduce aerodynamic noise generated by the volume booster 10.

That is, the outer cylinder portion 165 includes a multiple passageways from an inner surface 185 to an outer surface 195 (i.e. through-holes in the outer cylinder portion. The multiple passageways provide a plurality of exit paths for fluid flowing from the exhaust port to the discharge port 36. By separating the exiting fluid jets, the outer cylinder portion 165 substantially reduces exit jet fluid interaction which is known to create aerodynamic noise in fluid flow control devices. Further, as previously mentioned, the embodiment described herein eliminates a known problem in volume booster design: diaphragm pressure reversal.

Diaphragm pressure reversal typically occurs when conventional noise attenuators are located downstream of discharge port. The conventional noise attenuator may induce a back pressure across the diaphragm to the extent that the differential pressure across the diaphragm is sufficient to invert a convolution in the diaphragm surface. Such inversion will create substantial stress on the diaphragm which may lead to premature failure. In the present embodiment, the noise attenuation provided by the manifold 120 is placed upstream of the discharge port 36 and therefore substantially less susceptible to pressure reversal and diaphragm inversion.

Referring to FIG. 2, the axial opening 128 provides for fluid communication between the exhaust chamber 68 of the lower portion 54 of the body 44 and the internal cavity 130 of the manifold 120. Also, the internal radial passages 132 provide for fluid communication between the internal cavity 130 of the manifold 120 and the annular passage 127 disposed between the manifold 120 and the spacer portion 58 of the body 44. The cap portion 56 of the body 44 of the volume booster 16 includes the control connection 34 and a threaded bore 138 connected by a fluid passage 140.

As is also depicted in FIG. 2 and as mentioned above, the present embodiment of the volume booster 16 includes the biasing assembly 49 disposed between the diaphragm assembly 50 and the cap portion 56 of the body 44. Generally, the biasing assembly 49 biases the diaphragm assembly 50 away from the cap portion 56 such that the valve seat 137 of the seating member 135 disposed in the axial opening 128 of the manifold 120 engages the exhaust plug 110 of the control element 46. This engagement closes the exhaust port 128.

The biasing assembly 49 includes a spring seat 53 and a spring 55. The spring seat 53 comprises a seating cup 57 including a bottom wall 59 and a sidewall 61 defining a cavity 63 therebetween. In one embodiment, the sidewall 61 can be a cylindrical sidewall thereby defining a cylindrical cavity 63. The seating cup 57 is disposed between the cap portion 56 of the body 44 and the diaphragm assembly 50 such that the bottom wall 59 contacts a portion of the diaphragm assembly 50 and the sidewall 61 is slidably disposed in the seating bore 51 of the cap portion 56. The spring 55 includes a coil spring disposed in the cavity 63 of the seating cup 57 and in engagement with the bottom wall 59 of the seating cup 57 in the cap portion 56 of the body 44, as shown. So configured, the spring 55 biases the seating cup 57 and diaphragm assembly 50 away from the cap portion 56.

As also shown in FIG. 2, the biasing assembly 49 includes an elastomeric ring 65 disposed between the sidewall 61 of the seating cup 57 and an internal sidewall 51b of the seating bore 51 of the cap portion 56 of the body 44. More specifically, the sidewall 61 of the seating cup 57 defines a circumferential groove 67 in an outer surface 61a. The groove 67 retains the elastomeric ring 65 and can include a lubricated rubber o-ring. In other embodiments, the grove 67 can be formed in the sidewall 51a of the seating bore 51 for retaining the elastomeric ring 65. So configured, the elastomeric ring 65 provides friction between the seating cup 57 and the seating bore 51 to eliminate small amplitude vibrations generated by the diaphragm assembly 50 during operation.

As described above, to actuate the actuator 12 in the downward direction, the positioner 14 sends a pneumatic signal to the volume booster 16. Depending on the flow of the pneumatic signal, the pneumatic signal either actuates the actuator 12 by itself, or the pneumatic signal activates the volume booster 16 which is supplemented by fluid supplied from the regulator 18. For example, if the pneumatic signal is not sufficient to activate the volume booster 16, as will be described, the fluid travels from the control connection 34, through the fluid passage 140 in the cap portion 56, beyond the booster adjustment device 52, and to the outlet chamber 64 of the lower portion 54 of the body 44, via the axial through-bore 116 in the spacer portion 58, and the bypass passage 69 in the lower portion 54 of the body 44. From there, the fluid exits the body 44, via the outlet connection 32, and enters the actuator supply port 42 of the actuator 12 to move the diaphragm 22 in the downward direction. While the pneumatic signal actuates the actuator 12, it is also provided to the signal chamber 142 defined by the cap portion 56 of the body 44. Additionally, a steady pneumatic supply is constantly provided to the supply chamber 62 of the lower portion 54 of the body 44 from the regulator 18 (shown in FIG. 1).

For the sake of description, a pressure differential across the volume booster 16 is defined as a pressure differential occurring across the diaphragm assembly 50, i.e., between the signal chamber 142 and the exhaust chamber 68. Because the exhaust chamber 68 is in continuous fluid communication with the output chamber 64 of the lower portion 54 of the body 44 (via the exhaust passages 96 in the exhaust trim component 76), it can also be said that a pressure differential across the volume booster 16 is defined as a pressure differential occurring between the signal chamber 142 and the output chamber 64.

If the pressure differential across the volume booster 16 is insubstantial, the booster remains in a quiescent or neutral state having the supply and exhaust plugs 108, 110 of the control element 48 remain in the substantially zero flow or closed positions, as depicted in FIG. 2, whereby each sealingly engages the valve seats 102, 137 of the respective supply and exhaust ports 100, 128. So disposed, the diaphragm assembly 50 stays in a static unloaded or neutral position. This position is also assisted by the spring 114 biasing the supply plug 108 into engagement with the supply port 100, and the spring 55 biasing the diaphragm assembly 50 into engagement with the exhaust plug 110. In contrast, a substantial pressure differential across the volume booster 16 is one that is great enough to affect the diaphragm assembly 50, whether up or down, to move the control element 48, relative to the orientation of the volume booster 16 depicted in FIG. 2.

When the controller 20 commands the positioner 14 to stroke the actuator 12 upward as depicted in FIGS. 1 and 2, the positioner 14 responds by modifying the pressure differential across the diaphragm assembly 50 to shift the volume booster 16 from its quiescent state. For example, the pneumatic signal transmitted to the volume booster 16 is decreased. This causes the pressure in the signal chamber 142 to decrease below the pressure in the outlet chamber 64. The diaphragm assembly 50 rises upward while the spring 114 biases the control element 48 upward such that the supply plug 108 seals against the valve seat 102 of the supply port 100, thereby keeping the supply path closed.

With the supply path closed, the control element 48 cannot move upward, but back pressure from the outlet chamber 64 moves the diaphragm assembly 50 further upward against the force of the spring 136. This moves the diaphragm assembly 50 away from the exhaust plug 110 of the control element 48 and opens the exhaust port 128 creating an "exhaust" state. With the exhaust port 128 open, the volume booster 16 defines an "exhaust path" between the outlet chamber 64 and the discharge port 36. That is, pressurized fluid in the outlet chamber 64 travels to the exhaust chamber 68 via the passages 96 in the exhaust trim component 76, then to the central cavity 130 of the manifold 120 via the exhaust port 128, through the internal radial passages 132 in the manifold 120, and out of the discharge port 36 to the atmosphere.

When the controller 20 commands the positioner 14 to stroke the actuator 12 downward, the positioner 14 responds by modifying the pressure differential across the diaphragm assembly 50 to shift the volume booster 16 from its quiescent state. For example, during operation, a positive pressure differential condition is achieved when pressure is substantially greater in the signal chamber 142 than in the exhaust chamber 68 such as when the positioner 14 delivers a high fluid flow to the control connection 34. This can occur when the controller 20 drives the positioner 14 to stroke the actuator 12 downward direction, as depicted in FIGS. 1 and 2. The high fluid flow forces the diaphragm assembly 50 downward, which moves the control element 48 downward, thereby keeping the exhaust plug 110 closed against the exhaust port 128 and moving the supply plug 108 away from the supply port 100.

Thus, the volume booster 16 operates in an "inlet" state and subsequently opens a "supply path," which provides fluid flow from the regulator 18 to the actuator 12 via the volume booster 16. Specifically, fluid from the regulator 18 flows into the supply chamber 62, then through the supply port 100 and the outlet chamber 64 to the actuator 12, via the outlet connection 32. Again, because the outlet chamber 64 is also in constant fluid communication with the exhaust chamber 68 via the exhaust passages 96 in the exhaust trim component 76, the pressure in the common camber 64 is also registered on the second diaphragm 124 of the diaphragm assembly 50.

When the volume booster 16 operates with either the supply path or the exhaust path open, a fluid is flowing through the device. Upon completion of the commanded action, such as upward or downward stroking, the volume booster 16 will return to its quiescent or neutral state having the supply and exhaust plugs 108, 110 of the control element 48 remain in the substantially zero flow or closed positions, as depicted in FIG. 2.

In view of the foregoing, it should be appreciated that the scope of the invention is neither limited to the specific embodiment described with reference to the figures, nor to the various alternative embodiments described herein, but rather, to any embodiment that encompasses the spirit of the invention as defined by the following claims.

What is claimed:
1. A fluid flow control device, comprising:
a body having a inlet connection, an outlet connection, and a discharge port; and
a booster module disposed within the body comprising a control element and an actuator element having a manifold, a first diaphragm, a second diaphragm, and a noise-reducing trim element, the noise-reducing trim element comprising an outer cylinder portion, the booster module having a supply path extending between the inlet connection and the outlet connection and an exhaust path extending between the outlet connection and the discharge port, the manifold comprising a seating member having a plurality of passageways, the seating member extending through a central portion of at least one of the first and second diaphragms, and the noise-reducing trim element being operatively coupled immediately adjacent to the discharge port and having a plurality of passageways arranged to distribute a fluid flow therethrough to the discharge port via the exhaust path into a plurality of fluid jets to substantially inhibit jet flow interaction at the discharge port.

2. The device of claim 1, wherein the outer cylinder portion comprises a hollow cylinder having an inner surface and an outer surface in fluid communication via a plurality of through-holes.

3. The device of claim 1, wherein through-holes of passageways of the seating member have a larger cross sectional area than through-holes of the passageways of the outer cylinder portion.

4. The device of claim 1, wherein the seating member extends through a central portion of each of the first and second diaphragms.

5. The device of claim 1, further comprising an upper sealing member.

6. The device of claim 5, wherein the upper sealing member is affixed to the seating member via a swaged connection.

7. A fluid flow control device, comprising:
   a body having an inlet connection, an outlet connection, and a discharge port; and
   a booster module disposed within the body comprising a control element and an actuator element, the booster module having a supply path extending between the inlet connection and the outlet connection and an exhaust path extending between the outlet connection and the discharge port such that the actuation element further comprises a diaphragm assembly including a fluid pressure reduction device and first and second diaphragms coupled to the fluid pressure reduction device, the fluid pressure reduction device including a seating member having a plurality of passageways and an outer cylinder portion having a plurality of passageways and disposed immediately adjacent to the discharge port, the seating member extending through a central portion of at least one of the first and second diaphragms, the fluid pressure reduction device operatively coupled to the control element and disposed within the exhaust path to substantially eliminate a pressure reversal across the diaphragm assembly.

8. The device of claim 7, wherein the outer cylinder portion comprises a hollow cylinder having an inner surface and an outer surface in fluid communication via a plurality of through-holes.

9. The device of claim 7, wherein through-holes of passageways of the seating member have a larger cross sectional area than through-holes of passageways of the outer cylinder portion.

10. The device of claim 7, wherein the seating member extends through a central portion of each of the first and second diaphragms.

11. The device of claim 7, wherein the fluid pressure reduction device comprises a manifold, the manifold including the seating member.

12. The device of claim 11, wherein the exhaust path terminates at the discharge port and the fluid pressure reduction device is disposed upstream of the discharge port.

13. The device of claim 7, further comprising an upper sealing member.

14. The device of claim 13, wherein the upper sealing member is affixed to the seating member via a swaged connection.

15. A fluid flow device, comprising:
   a body having an inlet connection, an outlet connection, and a discharge port; and
   a booster module disposed within the body comprising a control element and an actuator element, the booster module having a supply path extending between the inlet connection and the outlet connection and an exhaust path extending between the outlet connection and the discharge port, wherein the actuation element comprises a diaphragm assembly operatively coupled to the control element, the diaphragm assembly including a manifold, an upper diaphragm and a lower diaphragm, an upper support plate, a lower support plate, and an outer cylinder portion affixed between the upper and lower support plates to provide a predetermined space between the upper and lower diaphragms and maintain a substantially parallel orientation between such plates, the manifold comprising a seating member having a plurality of passageways, the seating member extending through a central portion of the upper diaphragm, and the outer cylinder portion being operatively coupled immediately adjacent to the discharge port and having a plurality of passageways arranged to distribute a fluid flow therethrough to the discharge port via the exhaust path into a plurality of fluid jets to substantially inhibit jet flow interaction at the discharge port.

16. The device of claim 15, wherein the outer cylinder portion is positioned radially inward of the upper support plate and the lower support plate.

17. The device of claim 15, wherein the seating member extends through a central portion of each of the upper and lower diaphragms.

18. The device of claim 15, wherein the outer cylinder portion has an upper surface and a lower surface in a substantially parallel orientation.

19. The device of claim 18, wherein the upper support plate and the lower support plate have a corresponding annular recesses to operatively receive the upper surface and the lower surface of the outer cylinder portion.

20. A fluid flow device comprising:
   a body having an inlet connection, an outlet connection, and a discharge port; and
   a booster module disposed within the body comprising a control element and an actuator element, the booster module having a supply path extending between the inlet connection and the outlet connection and an exhaust path extending between the outlet connection and the discharge port, wherein the actuation element comprises a diaphragm assembly operatively coupled to the control element, the diaphragm assembly including a manifold, an upper diaphragm and a lower diaphragm, an upper support plate and a lower support plate and an outer cylinder portion affixed therebetween to provide a predetermined space between the upper and lower diaphragms and maintain a substantially parallel orientation between such plates, the outer cylinder portion being operatively coupled immediately adjacent to the discharge port and having a plurality of passageways arranged to distribute a fluid flow therethrough to the discharge port via the exhaust path into a plurality of fluid lets to substantially inhibit jet flow interaction at the discharge port, wherein the upper and lower diaphragms are sealed to the upper and lower support plates, respectively, via elastomeric ring seals disposed immediately adjacent the upper and lower support plates.

* * * * *

UNITED STATES PATENT AND TRADEMARK OFFICE
CERTIFICATE OF CORRECTION

PATENT NO. : 8,689,832 B2
APPLICATION NO. : 12/901018
DATED : April 8, 2014
INVENTOR(S) : Michel K. Lovell Page 1 of 1

It is certified that error appears in the above-identified patent and that said Letters Patent is hereby corrected as shown below:

On the Title Page:

Item (57), under "ABSTRACT", at line 1, "a inlet" should be -- an inlet --.

In the Specification:

At Column 1, line 31, "which a" should be -- which --.
At Column 2, line 14, "a inlet" should be -- an inlet --.
At Column 4, line 2, "a outlet" should be -- an outlet --.
At Column 4, line 4, "a actuator" should be -- an actuator --.
At Column 5, line 11, "a outlet" should be -- an outlet --.
At Column 5, line 34, "an first" should be -- a first --.
At Column 5, line 52, "56" should be -- 66 --.
At Column 5, line 65, "56" should be -- 66 --.
At Column 7, lines 52-53, "175,176," should be -- 155,156, --.
At Column 7, line 60, "10." should be -- 16. --.
At Column 8, line 34, "46." should be -- 48. --.

In the Claims:

At Column 10, line 48, Claim 1, "a inlet" should be -- an inlet --.
At Column 12, line 36, Claim 20, "device" should be -- device, --.
At Column 12, line 57, Claim 20, "lets" should be -- jets --.

Signed and Sealed this
Third Day of November, 2015

Michelle K. Lee
*Director of the United States Patent and Trademark Office*